(12) United States Patent
Odom et al.

(10) Patent No.: US 6,516,320 B1
(45) Date of Patent: Feb. 4, 2003

(54) TIERED HASHING FOR DATA ACCESS

(75) Inventors: Paul S. Odom, Houston, TX (US); Michael J. Massey, Houston, TX (US)

(73) Assignee: Pliant Technologies, Inc., Houston, TX (US)

(*) Notice: Subject to any disclaimer, the term of this patent is extended or adjusted under 35 U.S.C. 154(b) by 0 days.

(21) Appl. No.: 09/264,298

(22) Filed: Mar. 8, 1999

(51) Int. Cl.⁷ .............................................. G06F 17/30
(52) U.S. Cl. ............................ 707/101; 707/7; 707/100
(58) Field of Search ........................... 707/1, 2, 10, 8, 707/100, 101, 7, 3, 4

(56) References Cited

U.S. PATENT DOCUMENTS

| | | | | |
|---|---|---|---|---|
| 5,440,732 A | * | 8/1995 | Lomet et al. | 395/600 |
| 5,621,727 A | * | 4/1997 | Vaudreuil | 370/60 |
| 5,675,785 A | * | 10/1997 | Hall et al. | 395/613 |
| 5,687,361 A | * | 11/1997 | Sarkar | |
| 5,701,459 A | * | 12/1997 | Millett et al. | 395/603 |
| 5,897,637 A | * | 4/1999 | Guha | 707/101 |
| 6,061,506 A | * | 5/2000 | Wollaston et al. | 395/500 |
| 6,112,209 A | * | 8/2000 | Gusack | 707/101 |
| 6,173,277 B1 | * | 1/2001 | Ashby et al. | 707/1 |
| 6,292,880 B1 | * | 9/2001 | Mattis et al. | |

OTHER PUBLICATIONS

"Message Filtering Method," Research Disclosure, XP-002141288 (Oct. 1998).

* cited by examiner

Primary Examiner—Hosain T. Alam
Assistant Examiner—Tam V Nguyen
(74) Attorney, Agent, or Firm—Coe F. Miles

(57) ABSTRACT

A memory for access by a program being executed by a programmable control device includes a data access structure stored in the memory, the data access structure including a first and a second index structure (each having a plurality of entries) together forming a tiered index. At least one entry in the first structure indicates an entry in the second structure. The number of entries in the second structure being dynamically changeable. A method for building a tiered index structure includes building a first-level index structure having a predetermined number of entries, building a second-level index structure having a dynamic number of entries, and establishing a link between an entry in the first-level index structure and an entry in the second-level index structure.

58 Claims, 12 Drawing Sheets

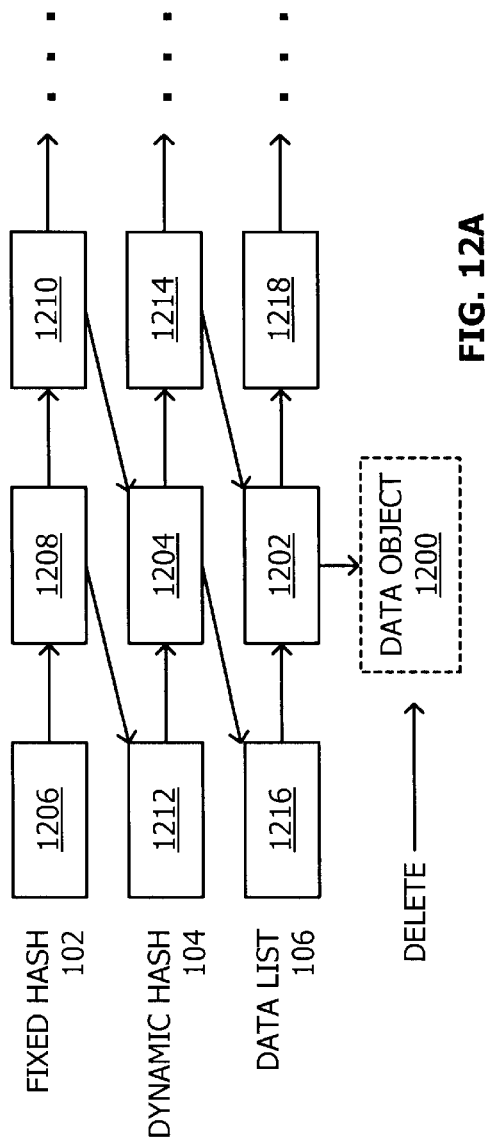
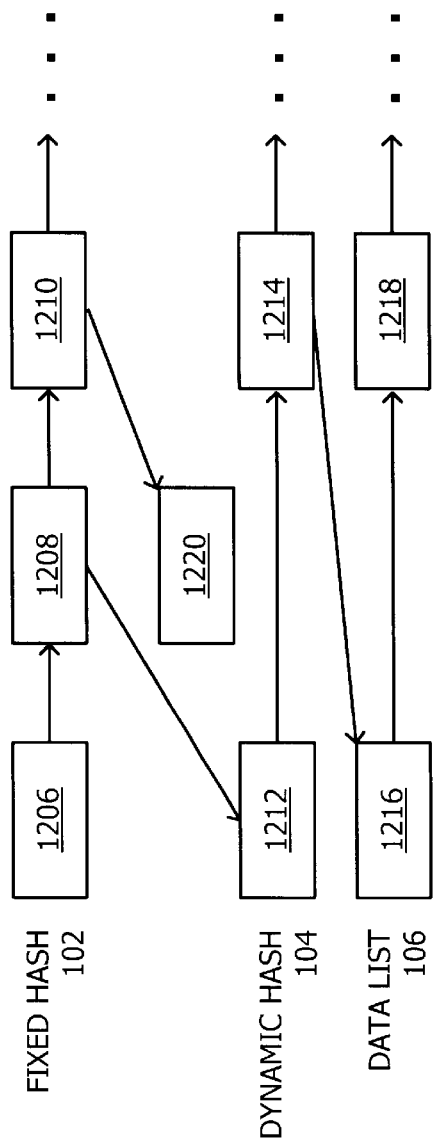

TIERED HASHING FOR DATA ACCESS

BACKGROUND

The invention relates generally to data access operations and, more particularly, to data access techniques using a tiered access structure.

Since their introduction, computers have increasingly been used as mechanisms for the storage and retrieval of information. Computers and computer systems (e.g., two or more computers coupled through a communication media) are now used extensively to store and manipulate large collections of data. One task associated with large data collections is the ability to provide fast and efficient access to each stored object. The term "object," as used herein, implies only a stored quantity. For example, a stored object may be a text file, an image file, a spreadsheet file, a table, a number, a text string, or any other quantum of information. In particular, the term "object" is not limited to that generally used in the field of object-oriented database design.

For relatively small data collections each stored object may be associated with a name or label. To view and/or manipulate a specific object, a user need only select the appropriate label from a list of similar labels and retrieve the associated data object. As the number of stored data objects increases, however, more sophisticated techniques—generally referred to as indexing—need to be employed.

One indexing technique commonly used in large database management systems employs an index configured in a B-tree structure (a balanced m-way tree structure). B-trees provide a means to search, insert and delete objects from a collection of objects in logarithmic time. One drawback to a B-tree index is that the balanced nature of the B-tree must be maintained as index entries are added or removed (corresponding to the storage and deletion of data objects). The computational resources needed to maintain a B-tree structure (especially for large data collections) may be significant.

Another indexing technique that may be used when data object key values are of varying size is the trie. A trie is a tree structure in which the branching at any level is determined not by the entire key value but by only a portion of it. For efficient use, a trie must be kept to as few levels as possible. The computational resources needed to accomplish this (especially as more and more data objects are stored) may, like with the B-tree index, be significant.

Yet another indexing technique is known as hashing. Unlike tree indexing techniques that search for an object identifier (e.g., a key) via a sequence of comparison operations, hashing determines the address or location of an object's identifier (along with the location of the data object itself) in a hash table by computing some arithmetic function $f()$ on the object's identifier X. Design of a hash index or table is based in part on a knowledge or assumption of the number of entries to be stored in the hash table. In practice, the number of table entries is significantly smaller than the number of possible identifiers. This implies that as more identifiers are stored (corresponding to more stored data objects), the probability increases that a new identifier will map to a table entry that is already full. Such an event is known as a collision. Identifiers that result in a collision are processed in accordance with one of a variety of standard overflow techniques such as, for example, rehashing, open addressing (e.g., random, quadratic, and linear), and chaining. As more data objects are stored, the number of collisions typically increases and the ability of a hash index to quickly locate a specific identifier decreases. At some point, the performance of a hash index may be so degraded that it must be reconstituted to allow for an increased number of entries. The computational resources needed to rebuild a hash index may be significant.

Thus, it would be beneficial to provide indexing techniques that dynamically accommodate (with reduced computational effort over prior art techniques) arbitrarily large data collections.

SUMMARY

In one embodiment the invention provides a memory for access by a program being executed by a programmable control device. The memory includes a data access structure stored in said memory, the data access structure including a first and a second index structure together forming a tiered index. The first structure including a plurality of entries, at least one of which indicates an entry in the second structure. The second structure also having a plurality of entries, the number of such entries being dynamically changeable.

In another embodiment, the invention provides a method for building a tiered index structure. The method includes building a first-level index structure having a predetermined number of entries, building a second-level index structure having a dynamic number of entries, and establishing a link between an entry in the first-level index structure and an entry in the second-level index structure. Methods in accordance with the invention may be stored in any media that is readable and executable by a computer system.

BRIEF DESCRIPTION OF THE DRAWINGS

FIGS. 12A and 12B show an illustrative hash structure update operation following a physical delete operation.

DETAILED DESCRIPTION

Methods and devices to facilitate computerized data access operations (e.g., storing, retrieving, and searching) using a combination of fixed and variable sized hashing structures in a tiered organization are described. The following embodiments, described in terms of accessing discrete (e.g., alphanumeric objects) and compound (e.g., data records, pictures, and spreadsheets) objects, are illustrative only and are not to be considered limiting in any respect. Further, in the interest of clarity not all features of an actual implementation are described herein. It will be appreciated that the development of any actual implementation requires numerous design decisions to achieve the developer's specific goals such as compliance with system-related and business-related constraints. Moreover, these decisions may be complex and time-consuming but would nevertheless be a routine undertaking for those of ordinary skill having the benefit of this disclosure.

Figure 1:
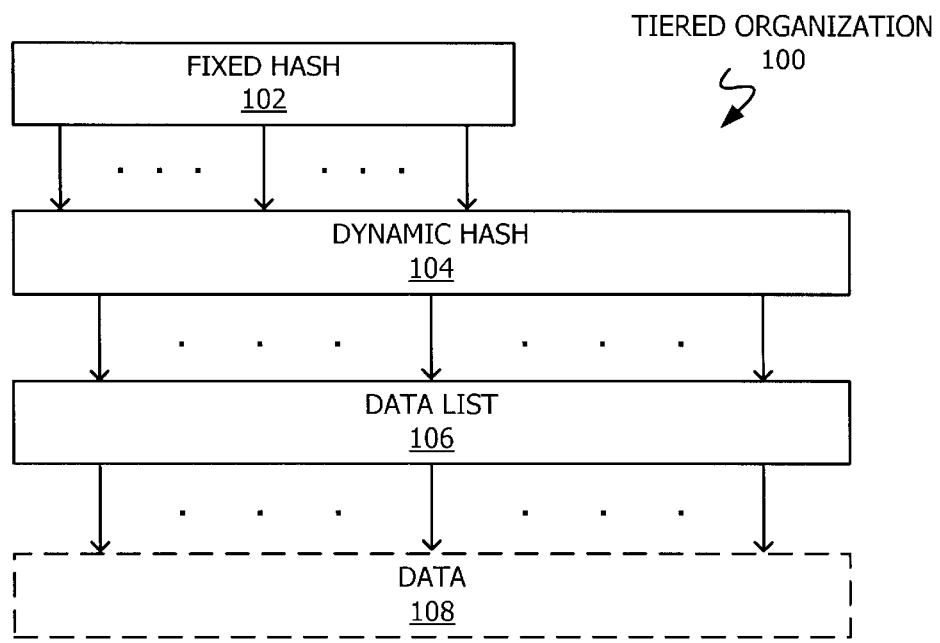
FIG. 1 shows a tiered data object access structure in accordance with one embodiment of the invention.

Referring to FIG. 1, techniques to access alphanumeric data objects (hereinafter referred to as discrete objects) in accordance with one embodiment of the invention may use 3-layered (tiered) organization 100 that includes fixed hash 102, dynamic hash 104, and data list 106 structures to access data 108.

Each layer—102, 104 and 106—provides an increasing level of specificity as to the location of a target data object. By way of example, discrete objects may be accessed by hashing on the characters that comprise the objects themselves: fixed hash 102 may provide hashing on X characters of a discrete object; dynamic hash 104 may provide hashing on (X+Y) characters of a discrete object; and data list 106 may identify a discrete object's location through an N-byte pointer (e.g., if N=P+Q, then P bytes may be used to identify a file within which the discrete data object has been stored, and Q bytes may be used to identify the data object's location/offset within the identified file).

In general, fixed hash 102 divides the range over which a data object may exist into a relatively small number of regions. For example, if a target data object is an alphanumeric object whose length may be up to 256 characters (allowing more than $10^{410}$ or $2^{3,280}$ data objects—assuming 40 alphanumeric characters are possible), fixed hash 102 may have only 1600 entries; enough to identify all possible two character alphanumeric strings. Although arbitrary, the size of hash 102 is, as its name suggests, fixed at any given time. The number of entries in any given implementation is a tradeoff between the amount of memory needed to store the fixed hash structure and the desired access speed.

In general, dynamic hash 104 provides a mechanism to further refine the location of a target data object. For example, if fixed hash 102 compartmentalizes a target data object based on two alphanumeric characters, dynamic hash 104 may compartmentalize the data object based on an additional two alphanumeric characters. In this example, dynamic hash 104 may contain more than 2.5 million entries; enough to identify all possible four character alphanumeric strings. A significant feature of dynamic hash 104 is that, unlike fixed hash 102, it is not generally initially populated with each possible entry. Instead, dynamic hash entries may be generated and logically ordered within hash 104 during data object storage operations. Thus, as the number of data objects stored increases, the size of dynamic hash 104 increases. Thus, the on-going performance of data access operations may dynamically populate dynamic hash 104—dynamic hash 104 consumes only that memory needed to index/identify data objects actually stored.

In general, data list 106 provides a mechanism to efficiently locate any data object in data 108. For example, data list 106 has an entry that uniquely identifies the location for each data object stored in data 108. Like dynamic hash 104, data list 106 may initially be an empty structure. Data 108 may include one or more files distributed over one or more storage devices, computer systems, or networks. In one embodiment, data may be stored in packed binary files, wherein multiple data objects may be stored in a single file.

Figure 2:
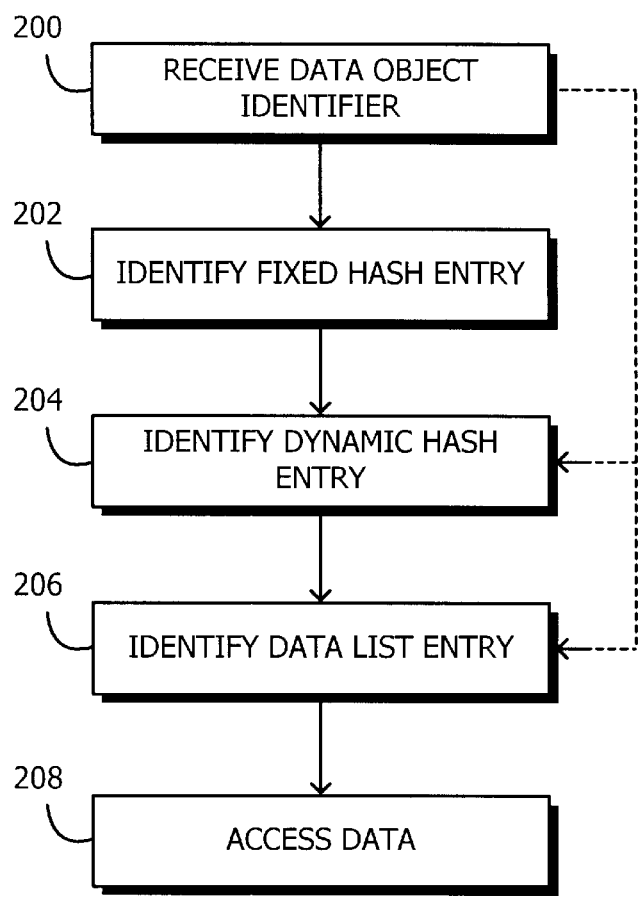
FIG. 2 shows a flowchart for an access operation using the tiered structure of FIG. 1.

FIG. 2 illustrates an access operation in accordance with one embodiment of the invention using the tiered structure of FIG. 1. Initially, a target data object is identified (block 200). Based on the data object's identifier, a unique entry in fixed hash 102 is identified (block 202). Starting with the dynamic hash entry identified during the acts of block 202, the data object's identifier is further examined to identify a dynamic hash entry (block 204). Starting with the data list entry identified during the acts of block 204, the data object's identifier is further examined to determine if the target data object is present in data 108 (block 206), following which the specified access operation (e.g., store, retrieve, or delete) may be performed (block 208).

Structures 102, 104, and 106 in accordance with the invention may be implemented in any convenient manner. For example, each structure may be implemented as an array or a linked list. Further, each structure may be implemented independently of the others. In the following embodiments, however, each of fixed hash 102, dynamic hash 104, and data list 106 structures are implemented as linked lists.

Figure 3:
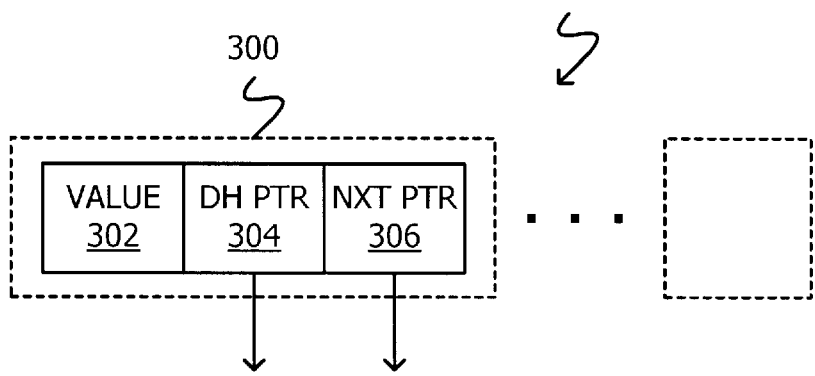
FIG. 3 shows the internal organization of a fixed hash structure in accordance with one embodiment of the invention.
Figure 4:
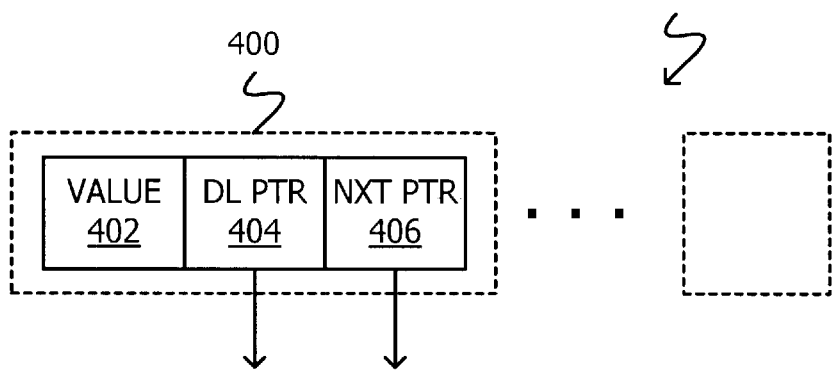
FIG. 4 shows the internal organization of a dynamic hash structure in accordance with one embodiment of the invention.
Figure 5:
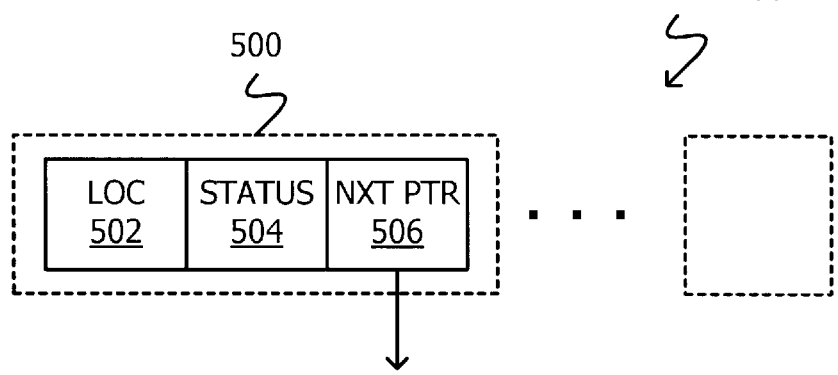
FIG. 5 shows the internal organization of a data list structure in accordance with one embodiment of the invention.

Referring to FIGS. 3, 4, and 5, fixed hash structure 102 may include a predetermined number of entries, each of which (e.g., entry 300) may include: a value component 302 corresponding to a first portion of a data object's identifier; a dynamic hash pointer component 304 to indicate an associated dynamic hash entry; and a next pointer component 306 to indicate the next logical fixed hash entry. Dynamic hash structure 104 may include a variable number of entries, each of which (e.g., entry 400) may include: a value component 402 corresponding to a first and second portion of a data object's identifier; a data list pointer component 404 to indicate an associated data list entry; and a next pointer component to indicate the next logical dynamic hash entry. Similarly, data list structure 106 may include a variable number of entries, each of which (e.g., entry 500) may include: a location component 502 to indicate the location of a stored data object; a status component 504 to indicate whether the associated data object has, for example, been deleted; and a next pointer component to indicate the next logical data list entry.

Figure 6:
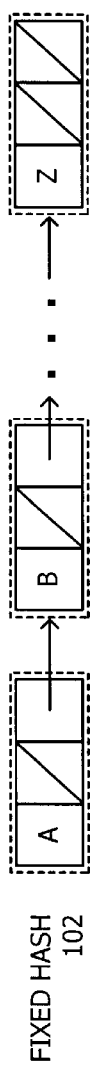
FIG. 6 shows an initialized fixed hash structure in accordance with one embodiment of the invention.

By way of example, consider a link-list implementation using the structures of FIGS. 3, 4, and 5 in which fixed hash entries are identified based on a hash of a discrete object's first character (X=1) such as "A," "B," and "Z," dynamic hash entries hash on the first two characters of the discrete object (Y=1), and data list entries identify a data object's location through a 5-byte pointer (e.g., P=1 and Q=4). Thus, before any data is stored, a tiered hashing structure in accordance with the preceding definition may appear as shown in FIG. 6. (Components within fixed hash entries are arranged in the order discussed above. Diagonal slash marks indicate null pointer values.)

Figure 7:
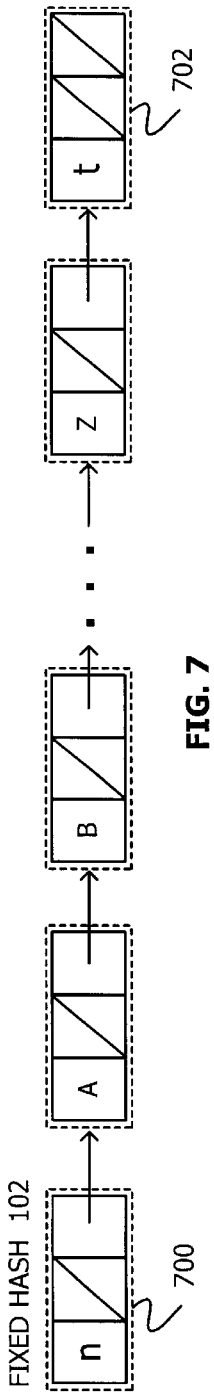
FIG. 7 shows a fixed hash structure including null and terminal elements in accordance with one embodiment of the invention.

To simplify some link list operations (such as an insert or a delete operation), fixed hash 102 may incorporate a null entry and a terminal entry. As shown in FIG. 7, null entry 700 precedes the first fixed hash entry and terminal entry 702 follows the last fixed hash entry. For convenience, null entry 700 and terminal entry 702 may have the same structure as fixed hash entry 300. The value component of null entry 700 (denoted as 'n') may be chosen so that it is less than any value which a data object may assume. The value component of terminal entry 702 (denoted as 't') may be chosen so that it is greater than any value which a data object may assume.

Figure 8:
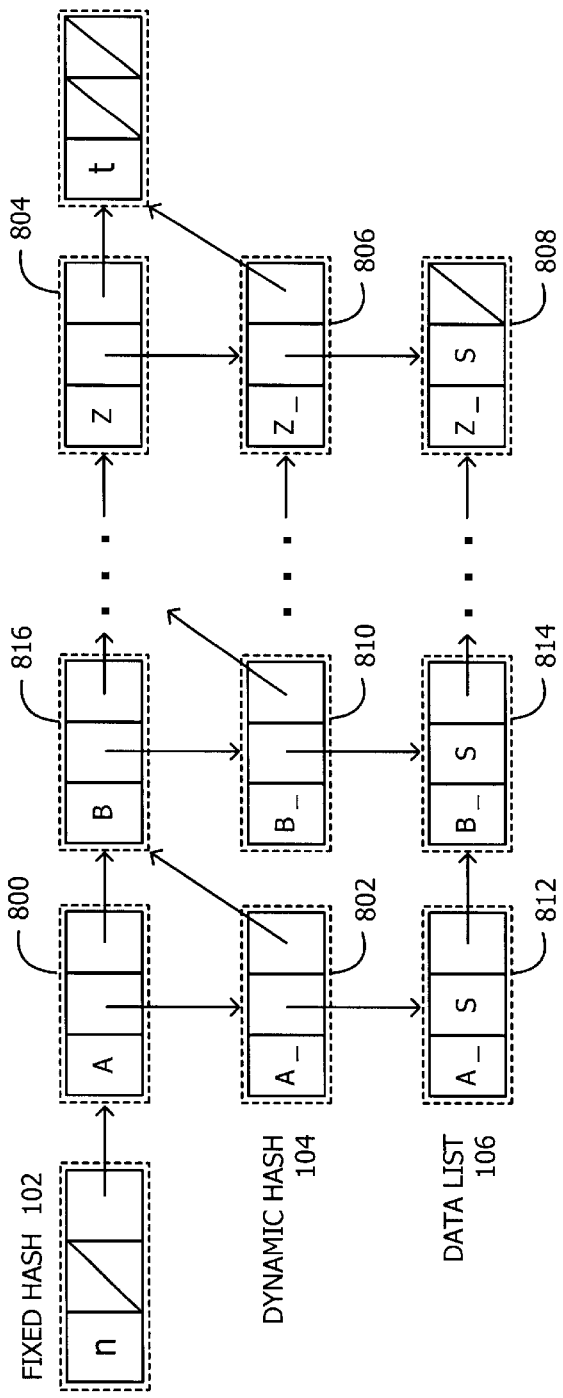
FIG. 8 shows an initialized and seeded tiered hash structure in accordance with one embodiment of the invention.

While dynamic hash 104 and data list 106 structures may initially be null or empty structures (link-lists, arrays, etc.), it may be beneficial to provide an initial seeding of entries to improve the speed of data access operations when data store 108 is nearly empty. As shown in FIG. 8, one initial seeding may use the values generated to populate fixed hash 102 to seed both dynamic hash 104 and data list 106 structures. In this embodiment, each fixed hash entry initially has its dynamic hash pointer component set to a corresponding entry in dynamic hash 104. For example, if "A" is the value of fixed hash entry 800, its dynamic hash pointer component may point to dynamic hash entry 802—that entry having the value "A_" (where "_" represents a space character). Each dynamic hash entry, in turn, has its next component set to point to the next logical fixed hash entry. For example, dynamic hash entry 802 has its next component pointer set to fixed hash entry 816. This chaining ends when the last fixed hash entry (entry 804, for example) points to the corresponding dynamic hash entry (entry 806, for example) which, in turn points to the terminal entry 702.

Data list 106 may be seeded in a similar fashion. Each value component in dynamic hash 104 (e.g., "A_," "B_," and "Z_") may be duplicated in data list 106 as shown in FIG. 8. Each next pointer component in each data list entry may be set to indicate the location of the following data list entry (last entry 808 having its next pointer component set to null). In addition, the status component for each initial entry (e.g., entry 808) may be set to indicate the entry is a seed entry (denoted by the value "S").

Figure 9:
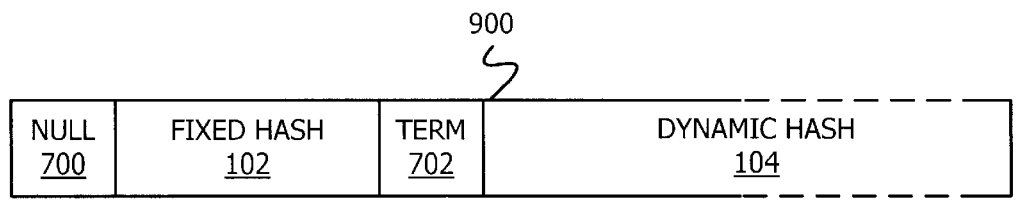
FIG. 9 shows a file structure that combines the fixed and dynamic hash structures in accordance with one embodiment of the invention.

It is noted that in the above embodiment the structure of fixed hash entries (e.g., 300) and dynamic hash entries (e.g., 400) are the same. It is further noted that the content of fixed hash 102 is determined at setup time and remains, thereafter, unchanged. As shown in FIG. 9, these two observations allow an implementation that combines fixed hash 102 and dynamic hash 104 structures into a single file structure 900. Specifically, file structure 900 is organized such that null entry 700 precedes fixed hash 102 which, in turn, is followed by terminal entry 702 and dynamic hash 104. The dotted lines signify dynamic hash 104 may grow as more data objects are stored.

Figure 10:
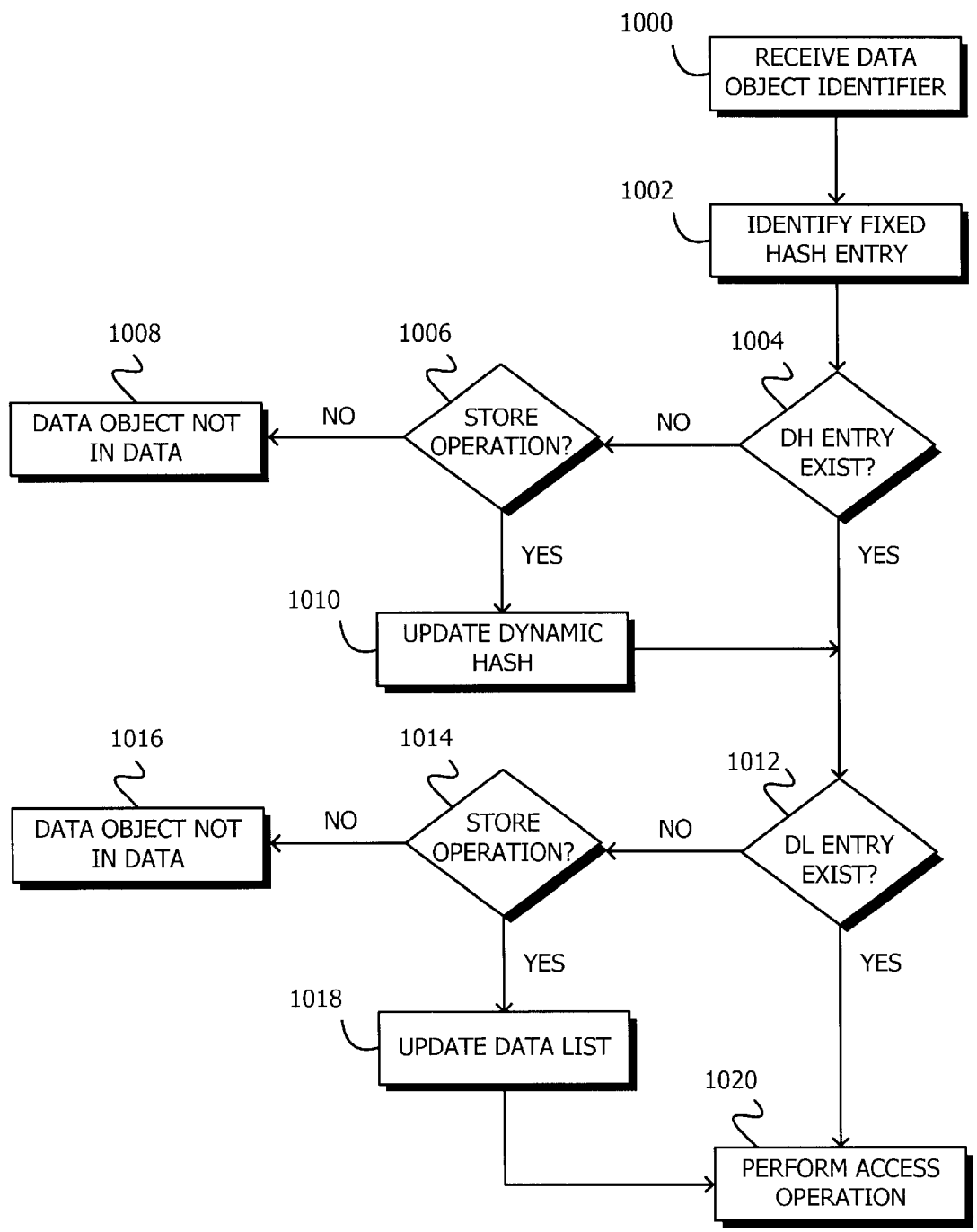
FIG. 10 shows a flowchart for accessing a discrete data object in accordance with one embodiment of the invention.

Illustrative data access techniques on the discrete object "ADDUCE" in accordance with the FIG. 10 (see also FIG. 2) and as applied to the initialized tiered hashing structure of FIG. 8 will now be described. Initially, discrete object ADDUCE is obtained (block 1000) and its first character ("A") is hashed to identify fixed hash entry 800 (block 1002). Next, it is determined whether an existing dynamic hash entry has a value component equal to the two character hash for "AD" (diamond 1004). To do this, the dynamic hash pointer component of fixed hash entry 800 is followed to dynamic hash entry 802. Because "A" (the value component of dynamic hash entry 802) is less than (lexicographically) the value of "AD," the next pointer component of entry 802 is followed to entry 816. Because "B" is greater than "AD," it is known that no entry in dynamic hash 104 exists for discrete object ADDUCE (the "no" prong of diamond 1004).

Figure 11A:
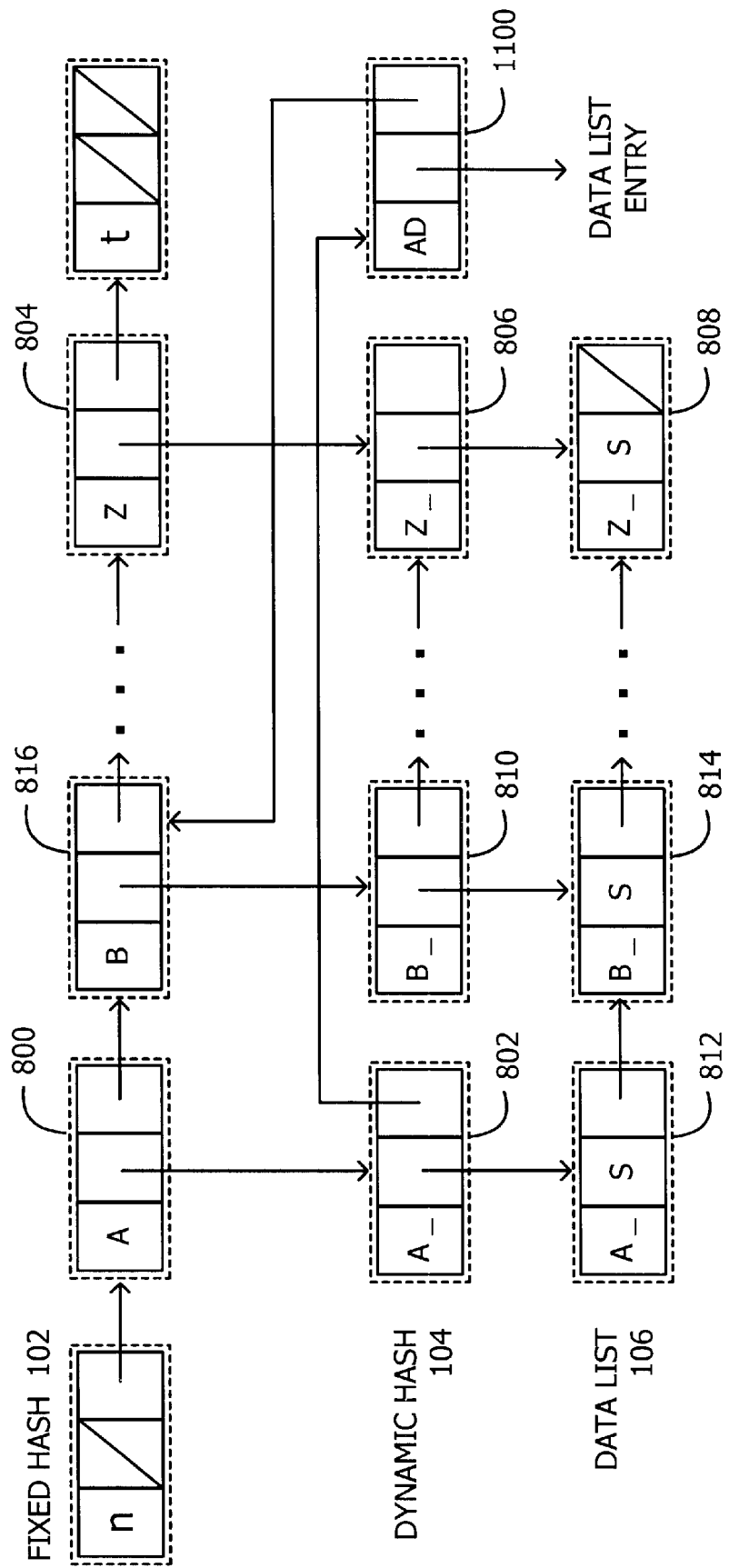
FIGS. 11A and 11B show illustrative tiered hashing structures in accordance with the flowchart of FIG. 10.

If the current access operation is not a store operation (the "no" prong of diamond 1006), no further processing is necessary (block 1008). As shown in FIG. 11A, if the current access operation is a store operation (the "yes" prong of diamond 1006), new dynamic hash entry 1100 having a value of "AD" may be created, physically appended to the end of dynamic hash 104 and logically ordered via next pointer component adjustments (block 1010).

If an entry exists in dynamic hash 104 corresponding to the value "AD" (the "yes" prong of diamond 1004) or on completion of the dynamic hash update acts of block 1010, it is determined whether an existing data list entry exists for the discrete object ADDUCE (diamond 1012). In the current example, no such entry exists because no dynamic hash entry having a value component equal to "AD" existed before the acts of block 1010—thus, processing continues via the "no" prong of diamond 1012.

Figure 11B:
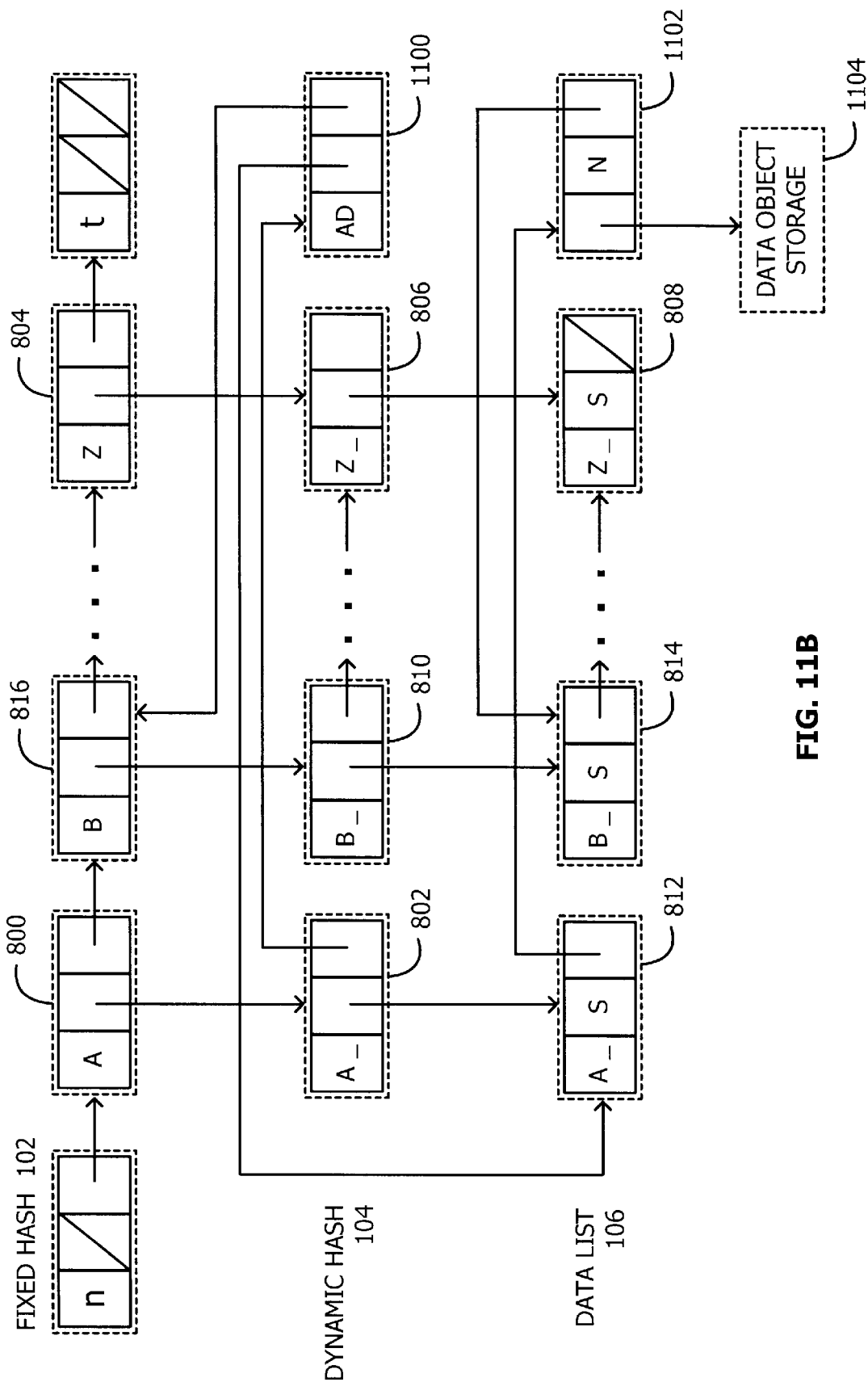

If the current access operation is not a store operation (the "no" prong of diamond 1014), no further processing is necessary (block 1016). As shown in FIG. 11B, if the current access operation is a store operation (the "yes" prong of diamond 1014), new data list entry 1102 having a value of "ADDUCE" may be created, physically appended to the end of data list 106 and logically ordered via next pointer components (block 1018). When an entry for discrete object ADDUCE is created, its status component may be updated to indicate it is a normal data object (denoted by the value "N" in data list entry 1102). It is significant to note that the data list pointer component of dynamic hash entry 1100 is adjusted to point to data list entry 812—that data list entry logically preceding data list entry 1102. For singly-linked lists, this technique allows additional entries to be inserted before entry 1102 in data list 106. (It will be recognized this same technique was applied to the empty, but seeded, tiered structure of FIG. 8.)

If an entry exists in data list 106 corresponding to discrete object ADDUCE (the "yes" prong of diamond 1012) or on completion of the data list update acts of block 1018, the specified access operation may be performed (block 1020). For example, if the specified access operation is a store operation, data object 1104 may be identified by data list entry 1102 by way of a location component having 5 bytes, where 1 byte identifies a particular file within which the data object (e.g., ADDUCE) is stored, and 4 bytes specify the object's location within the identified file. It is noted again, that a data object's physical location may be local or distant to a process executing a method in accordance with FIGS. 2 and 10. It is further recognized that different data objects may be stored on different storage devices, and that storage devices may be local to a single processor or dispersed across a local area or wide area network.

If the specified access operation is a retrieve operation, data object 1104 may be located via data list entry 1102's location component and retrieved.

If the specified access operation is a delete operation, data object 1104 may be located via data list entry 1102's location component and deleted. In one embodiment, a previously stored data object may be functionally deleted or physically deleted. If an object is functionally deleted, its data list entry status component is modified to indicate a functional deletion has occurred and the actual data object (e.g., data object 1104) is not disturbed. If an object is physically deleted, the data object is deleted from storage, its data list entry is deleted, and any necessary modifications (e.g., pointer values) to the tiered hashing structure are made. Referring to FIG. 12A, for example, if data object 1200 is to be physically deleted, then data list entry 1202 is deleted. In addition, because data list entry 1202 is pointed to by only a single dynamic hash entry (entry 1204 via a pointer to the data list entry immediately preceding data list entry 1202), it too may be deleted and pointers adjusted as shown in FIG. 12B. In FIG. 12B, for example, the dynamic hash pointer component of fixed hash entry 1210 has been adjusted to point to a dynamic hash seed value 1220. (This results from the linkage between fixed hash entry 1208, dynamic hash entry 1204, and data list entry 1202 assumed in FIG. 12A.)

When a physical deletion operation is performed, the disk space originally committed to the now-deleted entries may be marked for processing by a garbage collection routine. As described above (see FIGS. 4 and 5), one dynamic hash entry (e.g., 400) may be the same size as any other dynamic hash entry and one data list entry (e.g., 500) may be the same size as any other data list entry and, thus, "holes" created in dynamic hash structure 104 and data list structure 106 by physically deleted items may be readily reclaimed for use. This ability is further enhanced by the linked list implementation described herein because newly added entries do not need to be physically ordered as in many prior art data access techniques. Instead, a new entry may be placed at any available location and next element component (e.g., pointer components 406 and 506) used to logically order the entry.

In another embodiment of the invention, data objects are compound objects (databases, database records, document files, images, sound files, video or animation modules, spreadsheets, and the like) which are identified through a key or index field which, for the purposes of discussion, will be assumed to be numeric in nature.

Figure 13:
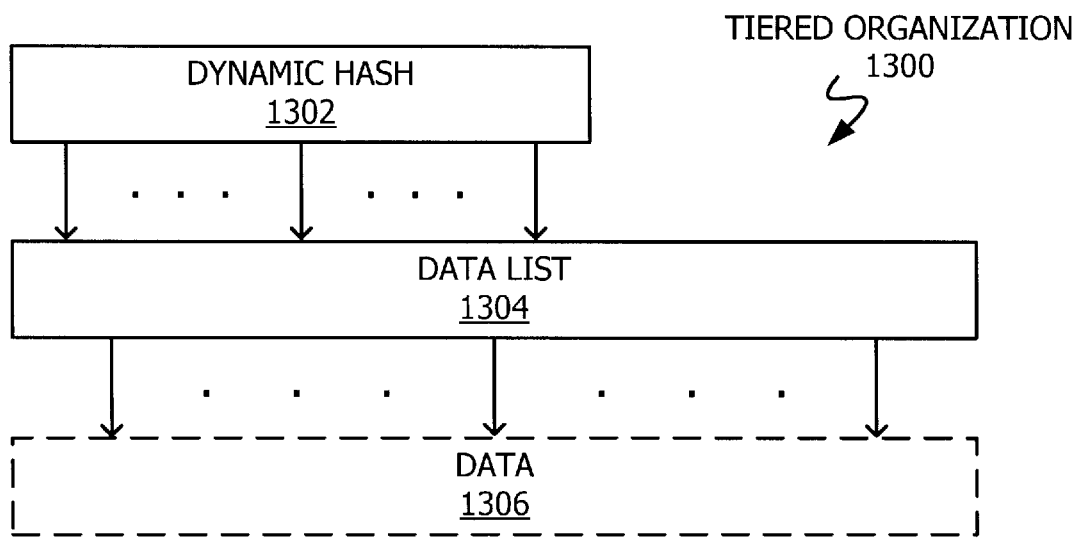
FIG. 13 shows a tiered data object access structure in accordance with another embodiment of the invention.

Referring to FIG. 13, techniques to access compound data objects in accordance with one embodiment of the invention may use 2-layered (tiered) organization 1300 that includes computed dynamic hash 1302 and data list 1304 structures to access data 1306. As in the discrete data object case, computed dynamic hash 1302 provides a compartmentalization of the data object's identifier. For example, if the target data object is identified by a numeric key/index value whose range is between zero and $10^9$ (a social security number, for example), computed dynamic hash 1302 may include 1000 entries. That is, computed dynamic hash initially partitions the range of data object identifiers into 1000 compartments. An entry in data list 1304 may then completely identify the target object and indicate its location in data store 1306.

Figure 14:
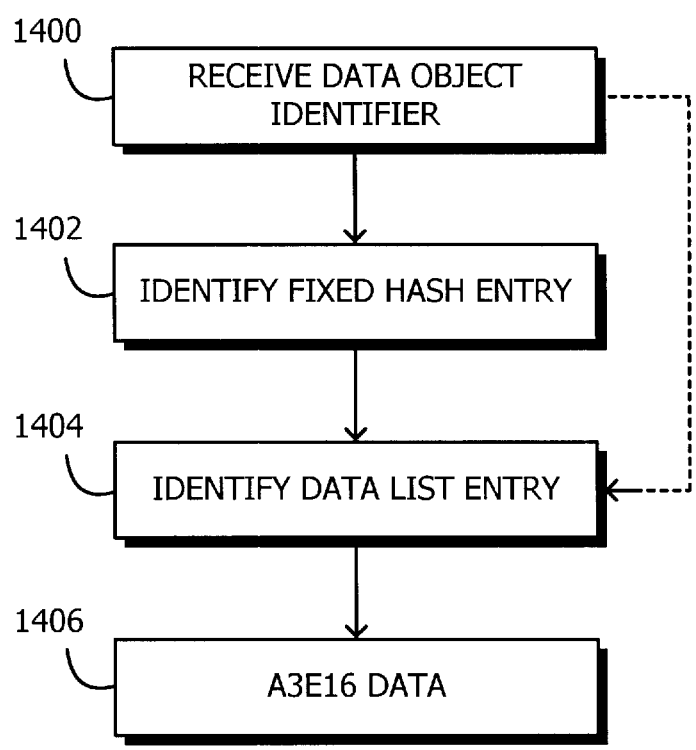
FIG. 14 shows a flowchart for an access operation using the tiered structure of FIG. 13.

FIG. 14 illustrates an access operation in accordance with one embodiment of the invention using the tiered structure of FIG. 13. Initially, a target data object is identified (block 1400). Based on the data object's identifier, a unique entry in fixed hash 1302 is identified (block 1402). Starting with the data list entry identified during the acts of block 1402, the data object's identifier is further examined to determine if the target object's identifier is found in data list 1306 (block 1404). If the target data object is present in data 1306 (i.e., there is an entry in data list 1304 corresponding to the target data object), the specified access operation (e.g., store, retrieve, or delete) may be performed (block 1406).

In one embodiment of the invention, an initial fixed hash entry may be identified by dividing a compound object's numeric identifier by a constant and taking the integer value of the quotient as shown in equation 1.

$$\text{Fixed Hash Entry} = \text{INT}\left[\frac{\text{Object Identifier Value}}{\text{Constant}}\right] \quad \text{EQ. 1}$$

It will be recognized that the value of "Constant" in EQ. 1 determines the number of entries in computed dynamic hash 1302 and, therefore, the granularity of the initial characterization of the tiered data access structure.

As with tiered structure 100 of FIG. 1, computed dynamic hash and data list structures 1302 and 1304 may be implemented in any convenient manner and independently of one another. In the following embodiments, however, each of computed dynamic hash and data list structures 1302 and 1304 are implemented as linked lists whose elements have the same general structure as those described in FIGS. 4 and 5. Each fixed hash entry may include a value component corresponding to a range of a data object's identifier (similar to value component 402 of FIG. 4), a data list pointer component to indicate an associated dynamic hash entry (similar to pointer component 404 of FIG. 4), and a next pointer component to indicate the next logical fixed hash entry (similar to pointer component 306 of FIG. 3). Each data list entry may include a location component to indicate the location of a stored data object (similar to location component 502 of FIG. 5) a status component to indicate whether the associated data object has, for example, been deleted; and a next pointer component to indicate the next logical data list entry (similar to status component 504 of FIG. 5), and a next pointer component to indicate the next logical data list entry (similar to pointer component 506 of FIG. 5).

Figure 15A:
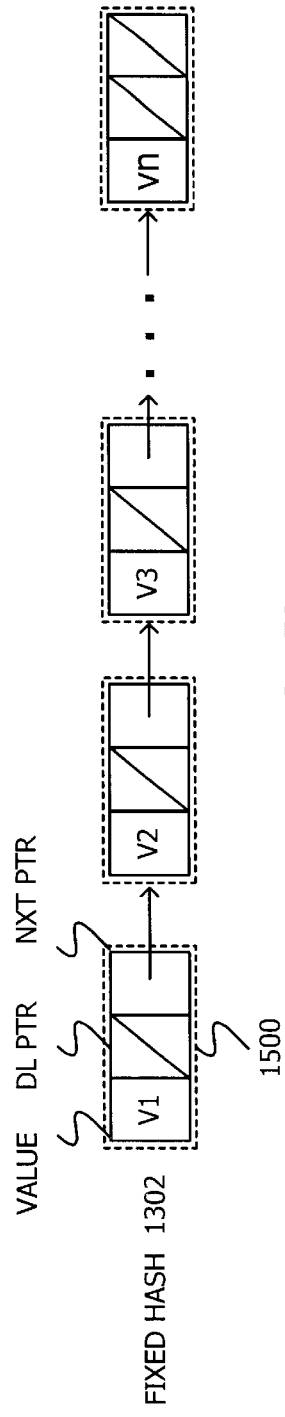
FIG. 15A shows a fixed hash structure in accordance with one embodiment of the invention for accessing compound data objects.
Figure 15B:
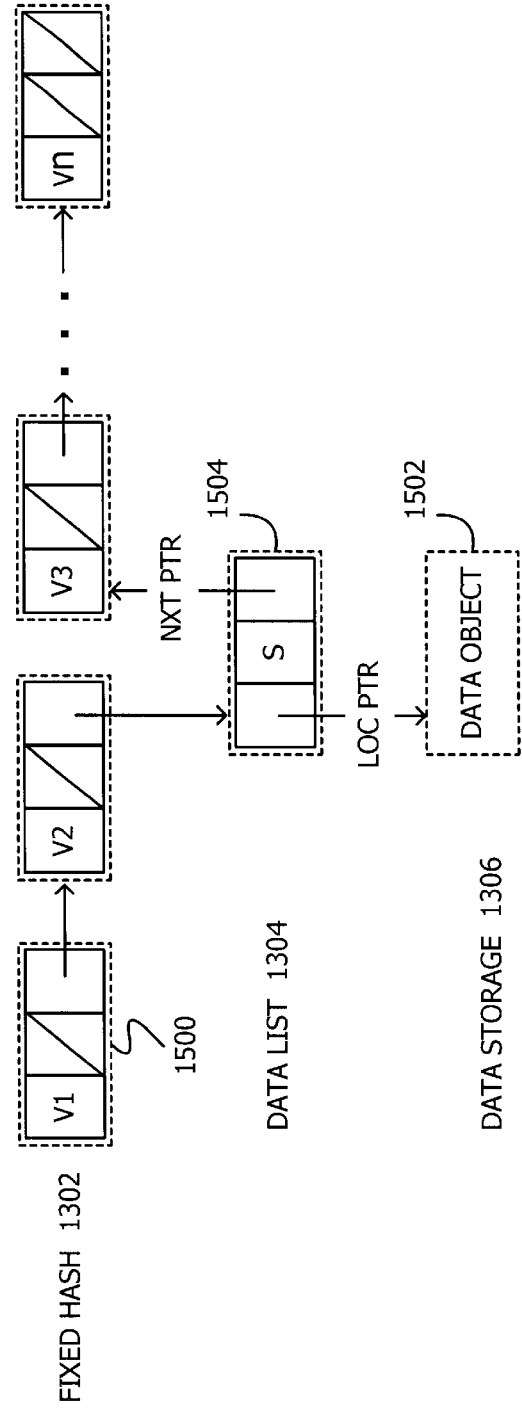
FIG. 15B shows the fixed hash structure of FIG. 15A following the storage of a single compound data object.

Referring to FIG. 15A, a tiered structure for use in accessing compound data objects may initially include only a fixed hash structure. As shown, each fixed hash entry (only entry 1500 is labeled for convenience) has a value component (V1, V2, V3, and Vn for example) corresponding to a hashing function result such as that generated in accordance with EQ. 1, a data list pointer component that is set to null (indicated by a diagonal line), and a next pointer component which is set to point to the next fixed hash entry. The final fixed hash entry may also have its next pointer component set to null. It is noted that, in contrast to fixed hash structures for accessing discrete data objects (see FIG. 7), null and terminator entries are generally not used in a fixed hash structure designed to access compound data objects. Referring now to FIG. 15B, storage of data object 1502 into data storage 1306 may generate data list entry 1504. Subsequent storage operations may result in data list entries being linked from other fixed hash entries.

Figure 16:
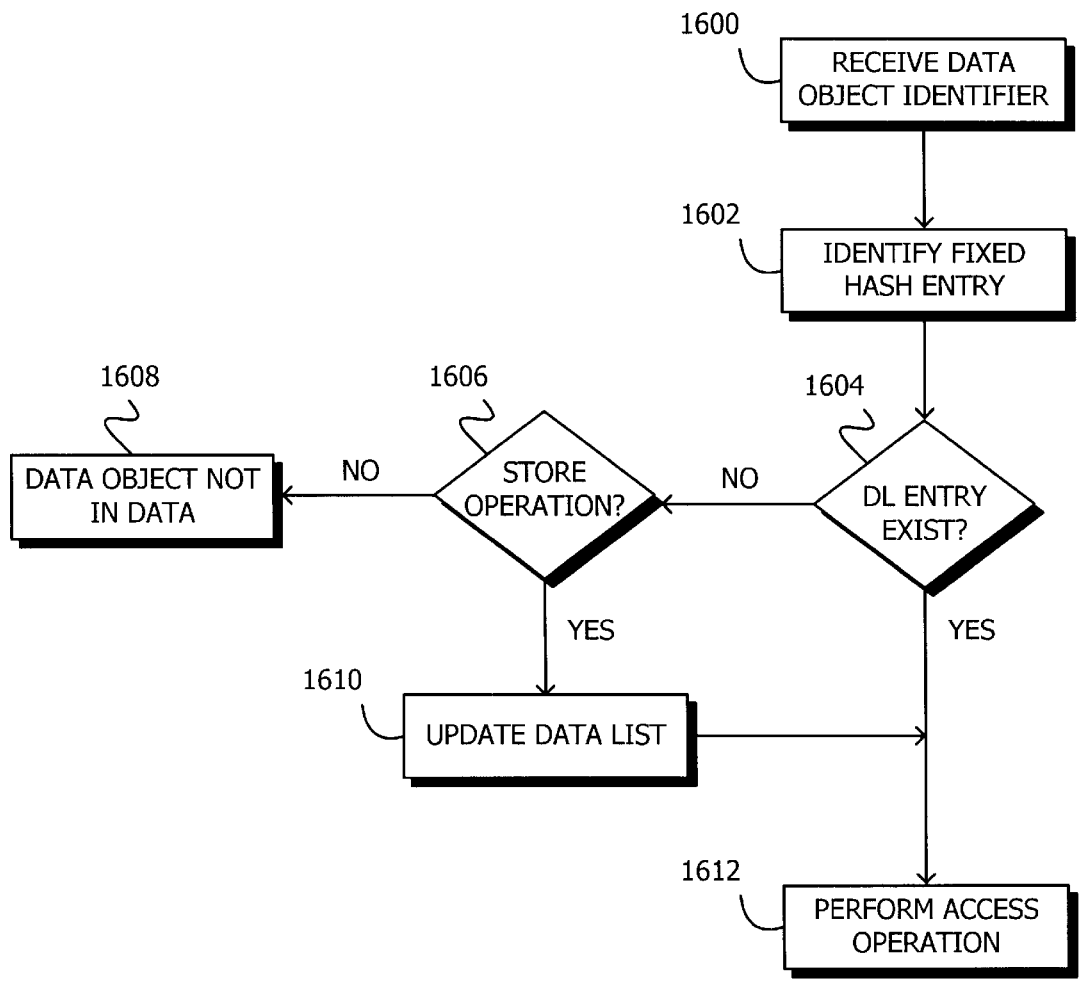
FIG. 16 shows a flowchart for accessing a compound data object in accordance with one embodiment of the invention.

An illustrative method to access compound data objects through tiered structure 1300 (see also FIGS. 15A and 15B) is shown in FIG. 16. Initially, a target compound data object's identifier is obtained (block 1600) and used to generate a fixed hash entry identifier in accordance with a specified hashing function (block 1602). Next, it is determined whether a data list entry corresponding to the received object identifier already exists (diamond 1604). To do this, the data list pointer component of the fixed hash entry identified during the acts of block 1602 is followed to a data list entry. Logically sequential data list entries are then visited (via next pointer components) to determine whether the target object has a data list entry. If a data object is visited that has a value component whose value is greater than that of the target object's identifier or if the search leads to a fixed hash entry it may be concluded that a data list entry for the target object does not exist (the 'no' prong of diamond 1604) and processing continues at diamond 1606.

If the current access operation is not a store operation (the 'no' prong of diamond 1606), further processing may terminate because the target data object does not exist in data store 1306 (block 1608). If the current access operation is a store operation (the 'yes' prong of diamond 1606), the data list may be updated by creating a new entry, appending it to the end of the existing data list and logically linking it into the data list and, possibly, fixed hash structures as indicated in FIGS. 15A and 15B (block 1610). Following the acts of block 1610, or in the event the data list had an entry corresponding to the target object's identifier (the 'yes' prong of diamond 1604), the designated access operation may be performed (block 1612).

Store, retrieve, and functional and physical delete operations (block 1612) may be performed as described above with respect to discrete objects.

In one embodiment, computed dynamic hash 1302 may be stored in one or more files and data list 1304 may be stored in a different one or more files. In this way, additional fixed hash entries may be added over the course of system operations. For example, if, at a first time, compound data objects having identifier values between 0 and 1000 are processed, computed dynamic hash 1302 may only be initialized to include 100 entries. If at a later time the range of identifier values increases from 1000 to 1000000, for example, additional fixed hash entries may be generated, appended to the end of the existing fixed hash entries and logically linked via their "next pointer" components. In this way, the size of fixed hash may grow as additional data objects are processed.

During storage operations it may occur that a large number of data objects have similar identifiers. This may lead to a large number of dynamic hash entries logically located between two logically consecutive fixed hash entries and/or a large number of data list entries logically located between two logically consecutive dynamic hash entries. In such cases, the data access techniques described above may lead to a relatively large number of sequential searches. To see this, consider a tiered hashing structure such as that of FIG. 8 in which 1000 discrete data objects are stored, all of whose first character is "A" (ensuring all data access operations pass through fixed hash entry 800) and whose second character is "B" (ensuring all dynamic hash entries are between entries 802 and 810 and all data list entries are between 812 and 814). In such a situation, an access operation directed to the 999th dynamic hash entry following entry 802 may require the sequential access and examination of 1000 dynamic hash entries (entry 802 and the 999 following entries). To overcome the performance bottleneck associated with such sequential access operations, fixed and/or dynamic hash entries may be modified to use overflow structures. Each fixed hash and dynamic hash entry may have an associated overflow structure, and each such structure may be independently created and manipulated. Overflow structures in accordance with the invention provide a mechanism to rapidly search selected portions of dynamic hash and/or data list structures.

Figure 17:
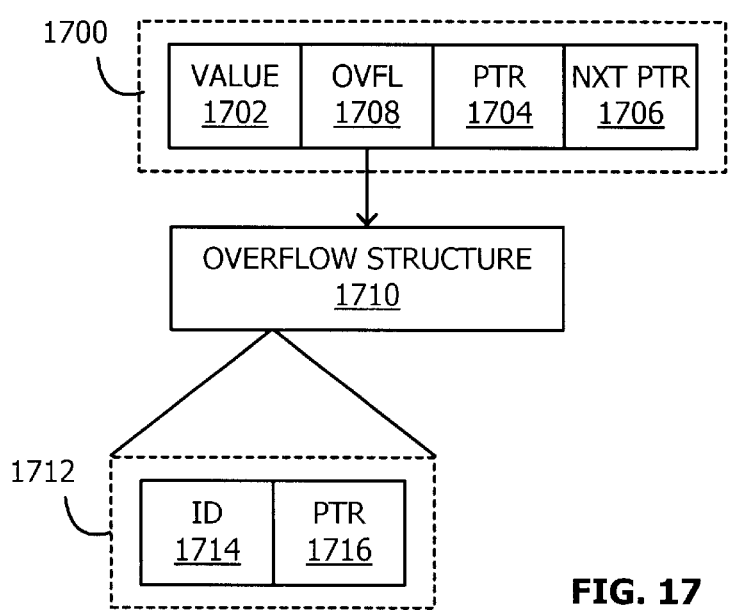
FIG. 17 shows an overflow structure in accordance with one embodiment of the invention.

Referring to FIG. 17, entry 1700 represents a modified fixed or modified dynamic hash entry. Value component 1702 is functionally equivalent to the value component of either a fixed or dynamic hash entry. Pointer component 1704 is functionally equivalent to the dynamic hash pointer component of a fixed hash entry, or the data list pointer component of a dynamic hash entry. Next pointer component 1706 is functionally equivalent to the next pointer component of either a fixed or dynamic hash entry. Overflow component 1708 may point to, or otherwise indicate, the presence of overflow structure 1710. For example, an overflow component having a zero value may indicate the fixed or dynamic hash entry has no associated overflow structure. In contrast, a non-zero value may indicate both the presence of an overflow structure and a location from which the overflow structure may be accessed.

Overflow structure 1710 may include one or more overflow entries (e.g., 1712), each of which may include identifier component 1714 and pointer component 1716. As its name implies, identifier component 1714 is used to identify a dynamic hash or data list structure entry via its value component. Pointer component 1716 points to, or otherwise indicates, a position in a dynamic hash structure (if overflow structure 1710 is associated with a fixed hash entry) or a data list structure (if overflow structure 1710 is associated with a dynamic hash entry). The entry indicated by pointer component 1716 will be that dynamic hash or data list entry just before the entry whose value component most closely matches identifier component 1716. Consider, for example, a tiered hashing structure used to access discrete data objects, where the fixed hash structure provides a two-character hash, and the overflow structure under consideration is associated with a fixed hash entry. In such a situation, identifier component 1714 may include a specified number of alphanumeric characters past the initial two; that is, characters 3 through N. The entry indicated by pointer component 1716 will be that dynamic hash entry just before the one which matches most closely identifier portion 1714.

To facilitate the data access operations of FIGS. 2 (blocks 204 and/or 206), 10 (diamonds 1004 and/or 1012), 14 (block 1404), and 16 (diamond 1604), overflow structures may be created when the number of sequential searches to locate a dynamic hash or data list entry exceeds a specified value (e.g., 6). In one embodiment, overflow structure 1710 may be implemented as a linear array of ordered entries. By ordered, it is meant that identifier component 1714 associated with a first overflow structure entry has a hash value greater than those overflow structure entries that precede it and less than those overflow structure entries that follow it. In another embodiment, overflow structure 1710 may be implemented as a B-tree (a structure that, by definition, orders the entries). Because overflow structure entries are ordered, they may be searched via a half-interval or binary search technique. Thus, the number of comparison operations needed to determine if overflow structure 1710 includes the sought after entry is on the order of log( n ), where n is the number of dynamic hash or data list entries the overflow structure spans—an improvement over the number of searches that would be necessary without the overflow structure.

In one illustrative implementation, when a linear search through either the dynamic hash or data list structure exceeds a specified value, enough memory may be allocated for a predetermined number of overflow structure entries (e.g., 10). When the initial entries are populated, another block of memory may be allocated that is large enough to include the existing entries plus an additional predetermined number of entries (e.g., 10). Once allocated, the existing entries may be copied into the new overflow structure, the memory associated with the original overflow structure deleted (e.g., marked for reclamation by a garbage collection process), and new entries added.

Figure 18A:
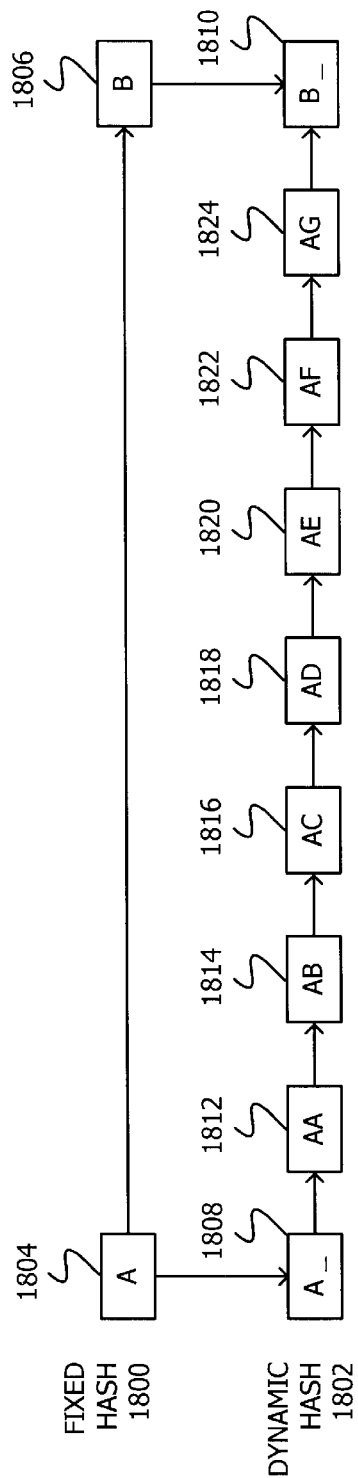
FIGS. 18A and 18B illustrate the use of an overflow structure in accordance with one embodiment of the invention.

By way of example, consider the tiered hashing structure of FIG. 18A. Fixed hash structure 1800 hashes on one character of a discrete object and dynamic hash structure 1802 hashes on two characters of a discrete object. Fixed hash structure 1800 includes entries 1804 and 1806 having value components equal to "A" and "B" respectively. Dynamic hash structure 1802 includes seed entries 1808 and 1810 (having value components equal to "A$_{\_}$" $_{and}$ "B$_{\_}$" respectively), and intermediate entries 1812 through 1824 having value components as shown. Assume the creation of an overflow structure for a fixed hash entry is triggered when the number of sequential dynamic hash search operations exceeds four (4). Finally, assume the discrete object ADVANTAGE is being accessed.

Discrete object ADVANTAGE first identifies fixed hash entry 1804 which, in turn, initially identifies dynamic hash entry 1808. Locating that dynamic hash entry that matches discrete object ADVANTAGE (i.e., entry 1818) requires 5 sequential operations: follow the dynamic hash pointer component of fixed hash entry 1804 to dynamic hash entry 1808, and then an additional 4 steps to locate entry 1818.

Figure 18B:
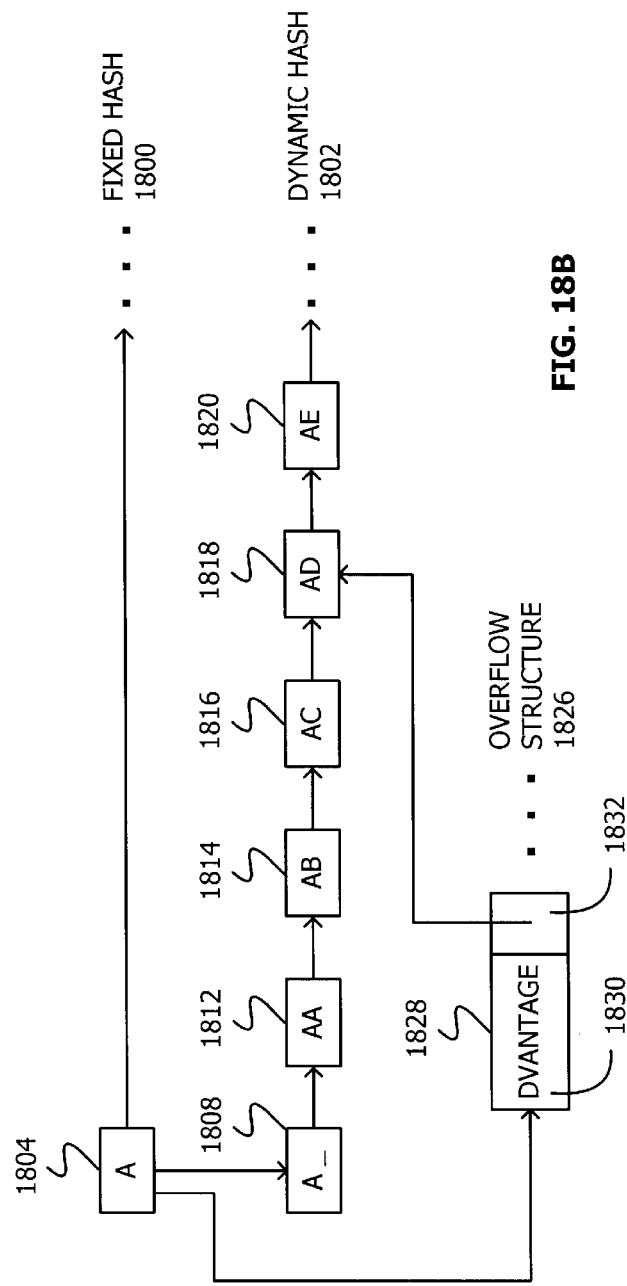

Referring now to FIG. 18B, because 5 is greater than 4, overflow structure 1826 may be created having a predetermined number of entries (e.g., entry 1828), and fixed hash entry 1804 modified to indicate the existence and location of overflow structure 1826. If identification component 1830 of overflow entry 1828 may accommodate up to 8 alphanumeric characters, it may be initialized to "DVANTAGE"— where the "A" of discrete object ADVANTAGE is implicitly incorporated by fixed hash entry 1804. To complete initialization of overflow entry 1828, pointer component 1832 may be set to indicate dynamic hash entry 1818—the dynamic hash entry that hashes to the first two characters of discrete object ADVANTAGE. As noted above, overflow structure 1826 may initially be created large enough to accommodate a predetermined number of entries. Only those entries actually needed, of course, are used—the remaining entries may be initialized to a value such as zero to indicate that they are empty.

Subsequent data access operations passing through fixed hash entry 1804 may note that overflow structure 1826 exists and will, using that structure, identify an initial dynamic hash entry. Overflow structure entries may be reorganized as necessary as new entries are added to maintain their order (e.g., a lexicographical or numeric ordering based on identifier component values). This ordering may be relied upon to perform a binary search operation for the target dynamic hash entry. It will be recognized that the discussion regarding the creation, manipulation, and use of overflow structure 1826 for fixed hash entry 1804 is equally applicable to the creation, manipulation, and use of overflow structures associated with dynamic hash entries. Further, the techniques and overflow structures described above in terms of discrete data objects are equally applicable to compound data objects.

One significant feature of a tiered access structure in accordance with the invention is that the memory needed to store dynamic hash and data list entries increases only as the number of stored data objects increases. There is no requirement for the existence of a predetermined number of dynamic hash and/or data list entries. Another significant feature of a tiered access structure in accordance with the invention is that it may grow to allow access to an arbitrarily large data pool without the need to reorganize or reinitialize the accessing structures (e.g., fixed hash, dynamic hash, and data list structures). Yet another significant feature of a tiered access structure in accordance with the invention is that overflow structures may be employed on an "as needed" basis for only a portion of a hash (fixed or dynamic) to speed data access. While overflow structures require additional memory, they provide a mechanism to rapidly access data objects regardless of the number or clustering of stored objects.

Tiered access structures that utilize linked list structures as described above provide the additional benefits of ease of data insertion and deletion, while avoiding any need to physically reorganize either the dynamic hash or data list structures to maintain a specified ordering. For example, each new dynamic hash or data list entry may simply be appended to the end of the existing dynamic hash or data list structure, or inserted in a location occupied by an entry which has been physically deleted. Ordering of the new element is provided through the manipulation of one or more "next pointer" components. This does not, however, preclude the use of periodic maintenance routines that may expand, contract or sequence the individual entries in a hash structure. While not necessary to the invention, such periodic maintenance routines may provide some benefit to long-term use of the resulting tiered index structure by allowing periodic expansion of the fixed hash structure, the addition or deletion of a layer (e.g., the addition of a fourth layer between data list 106 and data 108, or between data list 1304 and data 1306), or the reorganization of one or more overflow structures.

Prior art data access systems avoided the use of linked list implementations because of the perceived reliability problems associated with pointers. That is, if a pointer was broken (i.e., its value had been corrupted) it was assumed to be an unrecoverable error and the data pointed to by the pointer to be lost. Broken or corrupt pointers may be accommodated in accordance with the invention by any of a number of techniques including, for example, the use of doubly-linked lists, or conventional backup storage techniques.

Various changes in the structures and details of the illustrated operational methods are possible without departing from the scope of the claims. For instance, linked lists are not the only way to implement a tiered access structure. Fixed hash, dynamic hash, and data list structures may employ dynamically sizable arrays, for example. In non-linked lists implementations, pointer components (e.g., 304 and 306) may no longer be "pointers" in the linked list sense, but rather indexes into the appropriate data structure.

In addition, it will be recognized that the partitioning performed by a fixed hash structure does not have to be uniform. That is, some consecutive elements of a fixed hash may provide more or less resolution than some other consecutive elements in the fixed hash. Techniques employing a non-uniform fixed hash may be used to accommodate identifier domains that are known to have one or more regions that may inherently have more (or fewer) data objects than one or more other regions. Similar techniques may be employed with respect to dynamic hash and/or data list structures.

It will be further recognized that a tiered data access structure for discrete objects does not require 3 layers as shown in FIG. 1. A data access structure for discrete objects may employ two (a fixed hash and dynamic hash), four, or even more layers. Similarly, a data access structure for compound objects may employ three or more layers.

Further, acts in accordance with FIGS. 2, 10, 14, and 16 may be performed by a programmable control device executing instructions organized into a program module. A programmable control device may be a single computer processor, a plurality of computer processors coupled by a communications link, or a custom designed state machine. Storage devices suitable for tangibly embodying program instructions include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks.

While the invention has been disclosed with respect to a limited number of embodiments, numerous modifications and variations will be appreciated by those skilled in the art. It is intended, therefore, that the following claims cover all such modifications and variations that may fall within the true spirit and scope of the invention.

What is claimed is:

1. A memory for access by an application program being executed on a programmable control device, comprising:
    a data access hash structure stored in said memory, said data access hash structure including a first a second a third and a fourth index structure together forming a tiered hash index;
    said first structure including a plurality of entries, at least one of said plurality of entries indicating a unique entry in said second structure;
    said second structure having a plurality of entries, at least one of said plurality of entries indicating a unique entry in said third structure;
    said third structure having a plurality of entries, at least one of said plurality of entries indicating a unique entry in said fourth structure; and
    said fourth structure having a plurality of entries.

2. The memory of claim 1, wherein the plurality of entries of the first structure comprise a fixed number of entries and the plurality of entries of the second structure comprise a dynamically changeable number of entries.

3. The memory of claim 1, wherein the first structure comprises a linked list structure.

4. The memory of claim 3, wherein an entry in said first structure comprises:
    an identifier attribute;
    a next first structure entry indicator attribute; and
    a second structure entry indicator attribute.

5. The memory of claim 4, wherein an entry in said first structure further comprises an overflow indicator attribute.

6. The memory of claim 5, wherein said overflow indicator attribute indicates an overflow structure comprising a plurality of entries, at least one of said plurality of entries having an identifier attribute and a pointer attribute.

7. The memory of claim 6, wherein each of the plurality of entries in the overflow structure are ordered within the overflow structure in accordance with a value associated with each of said entries identifier attribute.

8. The memory of claim 1, wherein the second structure comprises a linked list structure.

9. The memory of claim 1, wherein an entry of said second structure comprises:
    an identifier attribute; and
    a next second structure entry indicator attribute.

10. The memory of claim 9, wherein an entry in said second structure further comprises an overflow indicator attribute.

11. The memory of claim 10, wherein said overflow indicator attribute indicates an overflow structure comprising a plurality of entries, at least one of said plurality of entries having an identifier attribute and a pointer attribute.

12. The memory of claim 11, wherein each of the plurality of entries in the overflow structure are ordered within the overflow structure in accordance with a value associated with each of said entries identifier attribute.

13. The memory of claim 1, wherein the number of entries in said third structure is dynamically changeable and related to the number of entries in said second structure.

14. The memory of claim 13, wherein the third structure comprises a linked list structure.

15. The memory of claim 13, wherein an entry in said third structure comprises:
    a data object location attribute;
    a status attribute; and
    a next third structure. entry indicator attribute.

16. The memory of claim 15, wherein the data object location attribute comprises:
    a data object file identifier portion; and
    a data object offset portion.

17. A method for building a tiered hash index structure, comprising:
    building a first-level hash index structure having a predetermined number of entries;
    building a second level hash index structure;
    building a third-level hash index structure;
    building a fourth-level hash index structure;
    establishing a link between an entry in the first-level index structure and a unique entry in the second-level index structure;
    establishing a link between an entry in the second-level index structure and a unique entry in the third-level index structure; and
    establishing a link between an entry in the third-level index structure and a unique entry in the fourth-level index structure.

18. The method of claim 17, wherein the act of building a first level hash index structure comprises building a link-list hash structure.

19. The method of claim 17, wherein the act of building a second-level hash index structure comprises building a variable-length hash structure.

20. The method of claim 19 wherein the act of building a second-level hash index structure comprises building a link-list hash structure.

21. The method of claim 17, further comprising establishing a link between an entry in the fourth-level hash index structure and a data object.

22. The method of claim 21, further comprising:
    receiving an object identifier;
    identifying an entry in said first-level hash index structure based on the object identifier;
    identifying an entry in said second-level hash index structure based on the identified entry in said first-level hash index structure;
    identifying an entry in said third-level hash index structure based on the identified entry in said second-level hash index structure; and
    identifying an entry in said fourth-level hash index structure based on the identified entry in said second-level hash index structure.

23. The method of claim 22, further comprising retrieving a data object indicated by the identified entry in said fourth-level hash index structure.

24. The method of claim 23, wherein the act of retrieving a data object comprises using a location component, where a first portion of said location component indicates a file, and a second portion of said location component indicates an offset into the file.

25. The method of claim 24, wherein the first portion of said location component comprises a 1-byte field, and the second portion of said location component comprises a 4-byte field.

26. The method of claim 22, wherein the act of receiving an object identifier comprises receiving a numeric identifier.

27. The method of claim 22, wherein the act of receiving an object identifier comprises receiving an alphanumeric identifier.

28. The method of claim 22, wherein the act of identifying an entry in said second-level hash index structure comprises traversing a link between the identified first-level hash index structure entry and an entry in said second-level hash index structure.

29. The method of claim 22, wherein the act of identifying an entry in said second-level hash index structure comprises:
   identifying a first entry in said second-level hash index structure based on the identified entry in said first-level hash index structure; and
   traversing said second-level hash index structure beginning at the identified first entry and comparing the object identifier with a portion of each entry traversed during the act of traversing said second-level hash index structure.

30. The method of claim 22, further comprising
   building an overflow structure; and
   establishing a link between the overflow structure and an entry in the second-level hash index structure.

31. The method of claim 30, wherein the act of identifying an entry in said second-level hash index structure uses the overflow structure.

32. The method of claim 17, wherein the act of building a third-level hash index structure comprises building a link-list hash structure.

33. The method of claim 17, wherein the act of identifying an entry in said third-level hash index structure comprises traversing a link between the identified second-level hash index structure entry and an entry in said third-level index structure.

34. The method of claim 17, wherein the act of identifying an entry in said third-level hash index structure comprises:
   identifying a first entry in said third-level hash index structure based on the identified entry in said second-level hash index structure; and
   traversing said third-level hash index structure beginning at the identified first entry and comparing the object identifier with a portion of each entry traversed during the act of traversing said third-level hash index structure.

35. The method of claim 17, further comprising:
   building an overflow structure; and
   establishing a link between the overflow structure and an entry in the second-level hash index structure and an entry in the third-level hash index structure.

36. The method of claim 35, wherein the act of building said overflow structure comprises building an ordered hash structure.

37. The method of claim 35, wherein the act of identifying an entry in said third-level hash index structure uses the overflow structure.

38. A program storage device, readable by a programmable control device, comprising instructions stored on the program storage device for causing the programmable control device to build a tiered hash index structure, including instructions to:
   build a first-level hash index structure having a predetermined number of entries;
   build a second-level hash index structure;
   a build a third-level hash index structure;
   a build a fourth-level hash index structure;
   to establish a link between an entry in the first-level hash index structure and a unique entry in the second-level hash index structure;
   establish a link between an entry in the second-level hash index structure and a unique entry in the third-level hash index structure; and
   establish a link between an entry in the third-level hash index structure and a unique entry in the fourth-level hash index structure.

39. The program storage device of claim 38, wherein the instructions to build a second-level hash index structure comprise instructions to build a variable-length hash structure.

40. The program storage device of claim 38, further comprising instructions to:
   receive an object identifier;
   identify an entry in said first-level hash index structure based on the object identifier;
   identify an entry in said second-level hash index structure based on the identified entry in said first-level hash index structure;
   identify an entry in said third-level hash index structure based on the identified entry in said second-level hash index structure; and
   identify an entry in said fourth-level hash index structure based on the identified entry in said second-level hash index structure.

41. The program storage device of claim 40, further comprising instructions to retrieve a data object indicated by the identified entry in said fourth-level hash index structure.

42. The program storage device of claim 40, wherein the instructions to receive an object identifier comprise instructions to receive a numeric identifier.

43. The program storage device of claim 40, wherein the instructions to receive an object identifier comprise instructions to receive an alphanumeric identifier.

44. The program storage device of claim 40, wherein the instructions to identify an entry in said second-level hash index structure comprise instructions to:
   identify a first entry in said second-level hash index structure based on the identified entry in said first-level hash index structure;
   traverse said second-level hash index structure beginning at the identified first entry; and
   identify a second entry in said second-level hash index structure based on the object identifier.

45. The program storage device of claim 44, wherein the instructions to identify the second entry in said second-level hash index structure comprise instructions to compare the object identifier with a portion of each entry traversed during the act of traversing said second-level hash index structure.

46. The program storage device of claim 40, wherein the instructions to identify an entry in said third-level hash index structure comprise instructions to:
   identify a first entry in said third-level hash index structure based on the identified entry in said second-level hash index structure;

traverse said third-level hash index structure beginning at the identified first entry; and identify a second entry in said third-level hash index structure based on the object identifier.

47. The program storage device of claim 46, wherein the instructions to identify the first entry in said third-level hash index structure comprise instructions to traverse a link between the identified second-level hash index structure entry and an entry in said third-level hash index structure.

48. The program storage device of claim 47, wherein the instructions to identify the second entry in said third-level hash index structure comprise instructions to compare the object identifier with a portion of each entry traversed during the act of traversing said third-level hash index structure.

49. The program storage device of claim 46, further comprising instructions to:

build an overflow structure; and establish a link between the overflow structure and an entry in the second-level hash index structure and an entry in the third-level hash index structure.

50. The program storage device of claim 49, wherein the instructions to build said overflow structure comprise instructions to build an ordered hash structure.

51. The program storage device of claim 49, wherein the instructions to identify a first entry in said third-level hash index structure comprise instructions to use the overflow structure.

52. The method of claim 17, wherein the act of building said fourth-level hash index structure comprises building a link-list structure.

53. The program storage device of claim 17, wherein the instructions to build said fourth-level hash index structure comprise instructions to build a link-list structure.

54. The method of claim 22, wherein the act of identifying an entry in said fourth-level hash index structure comprises:

identifying a first entry in said fourth-level hash index structure based on the identified entry in said third-level hash index structure; and traversing said fourth-level hash index structure beginning at the identified first entry and comparing the object identifier with a portion of each entry traversed during the act of traversing said fourth-level hash index structure.

55. The method of claim 54, further comprising building an overflow structure; and establishing a link between the overflow structure and an entry in the third-level hash index structure and an entry in the fourth-level hash index structure.

56. The method of claim 55, wherein the act of building said overflow structure comprises building an ordered hash structure.

57. The method of claim 55, wherein the act of identifying the first entry in said fourth-level hash index structure uses the overflow structure.

58. The program storage device of claim 40, wherein the instructions to identify an entry in said fourth-level hash index structure comprise instructions to:

identify a first entry in said fourth-level hash index structure based on the identified entry in said third-level hash index structure; and traverse said fourth-level hash index structure beginning at the identified first entry and comparing the object identifier with a portion of each entry traversed during the act of traversing said fourth-level hash index structure.

* * * * *